(12) United States Patent
Nakama (10) Patent No.: US 12,504,407 B2
(45) Date of Patent: Dec. 23, 2025

(54) SAMPLE VAPORIZATION CHAMBER AND GAS CHROMATOGRAPH COMPRISING SAID SAMPLE VAPORIZATION CHAMBER

(71) Applicant: Shimadzu Corporation, Kyoto (JP)

(72) Inventor: Yuji Nakama, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 267 days.

(21) Appl. No.: 18/286,349

(22) PCT Filed: Apr. 19, 2021

(86) PCT No.: PCT/JP2021/015820
§ 371 (c)(1),
(2) Date: Oct. 10, 2023

(87) PCT Pub. No.: WO2022/224294
PCT Pub. Date: Oct. 27, 2022

(65) Prior Publication Data
US 2024/0377368 A1  Nov. 14, 2024

(51) Int. Cl.
G01N 30/30  (2006.01)
B01D 53/02  (2006.01)
G01N 30/02  (2006.01)
G01N 30/18  (2006.01)

(52) U.S. Cl.
CPC .......... *G01N 30/30* (2013.01); *B01D 53/025* (2013.01); *G01N 30/18* (2013.01); *G01N 2030/025* (2013.01)

(58) Field of Classification Search
CPC .......... B01D 53/025; G01N 2030/025; G01N 2030/126; G01N 30/12; G01N 30/18; G01N 30/30

USPC .......... 73/23.41, 23.4, 24.06, 29.05, 30.04, 73/31.05, 864.86, 863.85, 6, 1.77
See application file for complete search history.

(56) References Cited

U.S. PATENT DOCUMENTS 5,472,670 A * 12/1995 Harrington .......... G01N 30/12
422/89

FOREIGN PATENT DOCUMENTS

| CN | 104101668 A | * 10/2014 |
| JP | 2009092672 A |   4/2009 |
| JP | 2019066500 A |   4/2019 |

OTHER PUBLICATIONS

Written Opinion for PCT application No. PCT/JP2021/015820 dated Jul. 6, 2021.

(Continued)

*Primary Examiner* — John E Breene
*Assistant Examiner* — Truong D Phan
(74) *Attorney, Agent, or Firm* — Muir Patent Law, PLLC (57) ABSTRACT

A sample vaporization chamber for gas chromatograph includes a cylindrical insert provided, at least on a lower end side of an inner peripheral surface or an outer peripheral surface thereof, with a first threaded portion, and an insert fixing portion provided with a second threaded portion to be threaded with the first threaded portion in the inner space of the housing. The insert fixing portion is configured to fix the insert in the inner space of the housing in a state in which the insert is accommodated in the inner space by threading the first threaded portion of the insert inserted in the inner space through the opening with the second threaded portion.

5 Claims, 6 Drawing Sheets

(56) References Cited

OTHER PUBLICATIONS

Office Action dated Nov. 5, 2024 for the Japanese Patent Application No. 2023-515881.
First Office Action dated Nov. 3, 2025, for Chinese Patent Application No. 202180096402.4.

* cited by examiner

SAMPLE VAPORIZATION CHAMBER AND GAS CHROMATOGRAPH COMPRISING SAID SAMPLE VAPORIZATION CHAMBER

TECHNICAL FIELD

The present invention relates to a sample vaporization chamber and a gas chromatograph equipped with the sample vaporization chamber.

BACKGROUND ART

It is common that a cylindrical member called an insert is provided inside a sample vaporization chamber of a gas chromatograph (see Patent Document 1). In particular, in a sample vaporization chamber compatible with a cold-on-column injection (OCI) method, an insert is used to accurately guide a syringe needle inserted to the inside of the sample vaporization chamber from the above to an end of the separation column. The cold-on-column injection (OCI) is an injection method in which a sample is injected directly into a separation column from a syringe needle from which the sample was collected in a state in which the sample vaporization chamber is at a low temperature, and then the internal temperature of the sample vaporization chamber is rapidly raised to about 450° C. to vaporize the sample injected into the separation column.

PRIOR ART DOCUMENT

Patent Document

Patent Document 1: Japanese Unexamined Patent Application Publication No. 2009-92672

SUMMARY OF THE INVENTION

Problems to be Solved by the Invention

An insert in a sample vaporization chamber is provided in a replaceable manner because it may be contaminated by sample adhesion. In a conventional sample vaporization chamber, an O-ring is attached to the upper portion of the outer peripheral surface of the insert to fix the insert in position and prevent the sample gas from flowing into the outer side of the insert. However, the O-ring may melt due to the heating by the heater during the analysis. Therefore, the portion of the insert which is upper than a portion to which the O-ring is attached is arranged in a relatively cool region outside the heating section heated by the heater inside the sample vaporization chamber. For this reason, the sample adhering to the portion of the insert arranged in a relatively low temperature region is not vaporized, easily causing contamination of the insert, which in turn increases the frequency of insert replacement.

In some cases, an insert is fixed in a sample vaporization chamber using a metal spring. In this case, an O-ring is not attached to the insert, so the entire insert can be accommodated within the heating section of the sample vaporization chamber. However, there was a problem that it was not easy to detach the insert from the sample vaporization chamber when replacing the insert.

The present invention has been made in view of the above-described problems, and the purpose of the present invention is to facilitate the replacement operation of the insert in a state in which the insert is fixed in the sample vaporization chamber without using an O-ring.

Means for Solving the Problems

A sample vaporization chamber according to the present invention is a sample vaporization chamber for gas chromatograph includes a housing provided with a heater therein, the housing being provided, on a top surface thereof, with an opening sealed by a septum, the sample vaporization chamber being configured to heat a sample with the heater to vaporize the sample to produce a sample gas, the sample being injected into an inner space of the housing with a syringe needle inserted into the inner space via the opening by piercing the septum, the sample vaporization chamber comprising:

a cylindrical insert provided, at least on a lower end side of an inner peripheral surface or an outer peripheral surface thereof, with a first threaded portion; and an insert fixing portion provided with a second threaded portion to be threaded with the first threaded portion in the inner space of the housing, the insert fixing portion being configured to fix the insert in the inner space of the housing in a state in which the insert is accommodated in the inner space by threading the first threaded portion of the insert inserted in the inner space through the opening with the second threaded portion.

A gas chromatograph according to the present invention is provided with:

the above-described sample vaporization chamber:

a separation column having one end in communication with the inner space of the housing of the sample vaporization chamber, the separation column being configured to separate components in the sample gas produced by the sample vaporization chamber from each other; and a detector in fluid communication with the other end of the separation column, the detector being configured to detect the components separated from each other by the separation column.

Effects of the Invention

According to the sample vaporization chamber according to the present invention, a first threaded portion is provided on the inner peripheral surface or the outer peripheral surface of at least the lower end side of the insert, an insert fixing portion having a second threaded portion to be threaded with the first threaded portion of the insert is provided in the inner space of the housing, and the insert is configured to be fixed in a state in which the insert is accommodated in the inner space of the housing by threading the first threaded portion with the second threaded portion. Therefore, it is possible to secure the insert in the inner space of the housing without using an O-ring. The insert can be attached to and detached from the insert fixing portion by simply rotating the insert relative to the insert fixing portion. Therefore, the replacement operation of the insert can be easily performed.

According to the gas chromatograph of the present invention, it is provided with the above-described sample vaporization chamber in which the insert can be fixed in the sample vaporization chamber by rotating the insert, and therefore, the maintenance work can be performed easily.

EMBODIMENTS FOR CARRYING OUT THE INVENTION

Hereinafter, one example of a sample vaporization chamber and a gas chromatograph according to the present invention will be described with reference to the attached drawings.

Figure 1:
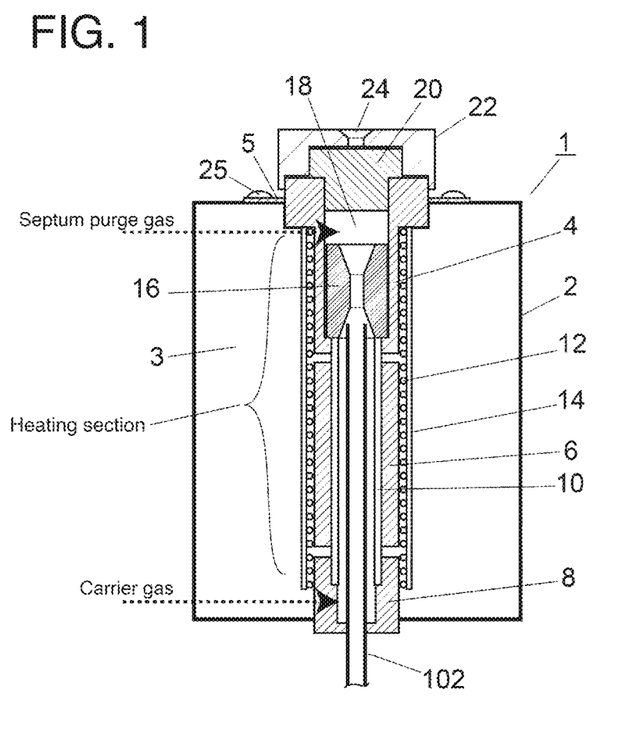
FIG. 1 is a cross-sectional diagram showing one example of a sample vaporization chamber.

One example of the sample vaporization chamber is shown in FIG. 1.

The sample vaporization chamber 1 has a housing 2, which is a hollow metal member. In the inner space 3 of the housing 2, from the upper side of the housing 2, an insert block 4, a heater block 6, and a carrier gas block 8 are provided. The insert block 4, the heater block 6, and the carrier gas block 8 are each a cylindrical metal member, the insert block 4 is fixed to the upper end portion of a pipe 10 extending in the vertical direction, the carrier gas block 8 is fixed to the lower end portion of the pipe 10, and the heater block 6 is fixed to the middle section (between the upper end portion and the lower end portion) of the pipe 10.

The upper end portion of the insert block 4 is exposed to the top surface of the housing 2 and forms an opening 18 for injecting a sample into the inner space 3 of the housing 2 from the above by a sampling syringe needle. The opening 18 is sealed with a septum 20. The septum 20 is held in place by a septum nut 22 threaded to the upper end portion of the insert block 4. The septum nut 22 has a through hole 24 for passing a sampling syringe needle.

A sheet metal 5 is attached to the outer peripheral surface of a portion of the upper end portion of the insert block 4 protruding upward from the top surface of the housing 2, for example, by welding, so that it extends in the horizontal direction, and the sheet metal 5 is fixed to the top surface of the housing 2 by bolts 25. Note that the structure for fixing the insert block 4 to the housing 2 is not limited thereto. Further, in a case where the insert block 4 is firmly connected to the heater block 6 and/or the carrier gas block 8, the insert block 4 itself need not be fixed to the housing 2 as long as the heater block 6 and/or the carrier gas block 8 is fixed to the housing 2.

The heater 12 is wound around the outer peripheral surfaces of the insert block 4, the heater block 6, and the carrier gas block 8, and a sheet-like heat insulation material 14 is wound around the further outside of the heater 12. The region out of the inner side regions of the insert block 4, the heater block 6, and the carrier gas block 8 to be heated by the heater 12 is referred to as the "heating section." Note that in FIG. 1, although the heater 12 is depicted as a coil, it can be a sheet-like heater or a heater embedded in the insert block 4, the heater block 6, or the carrier gas block 8.

Figure 2:
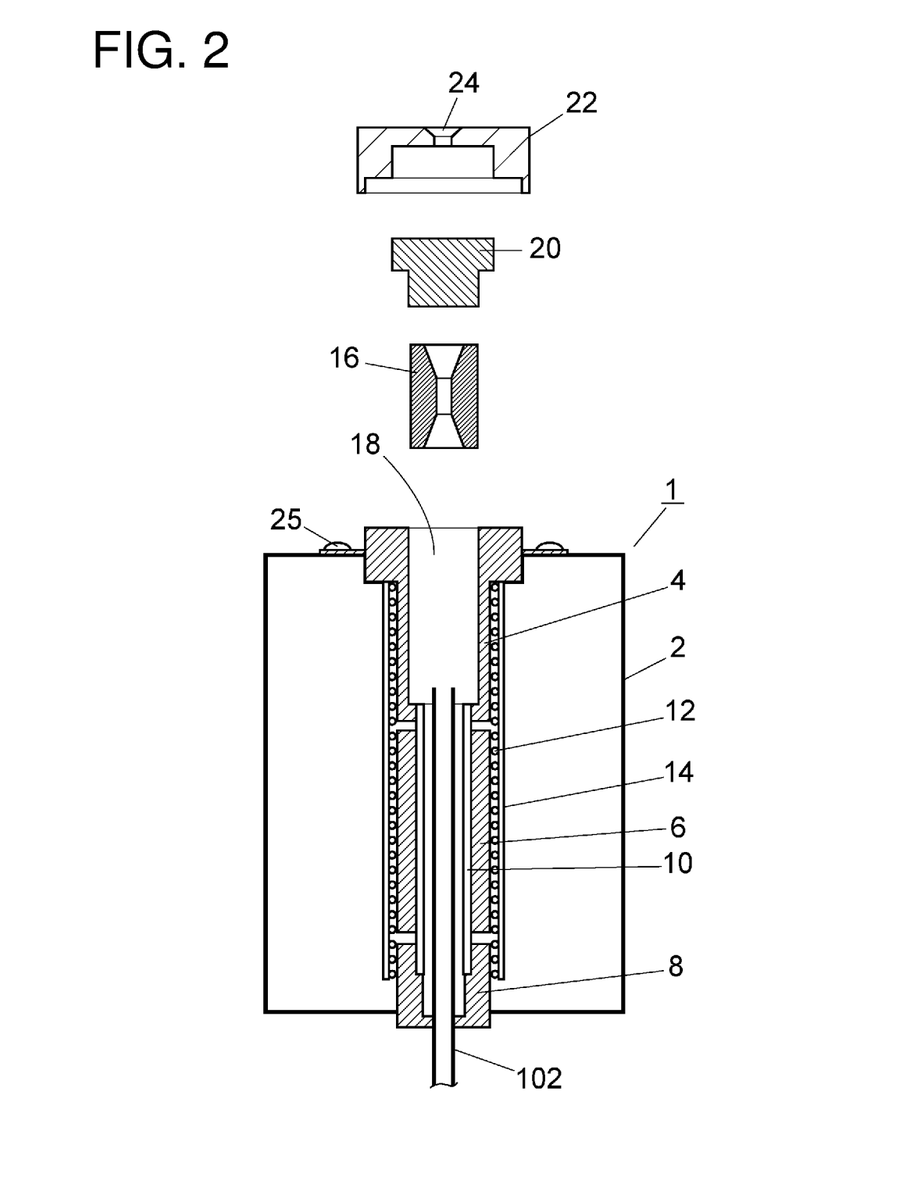
FIG. 2 is a diagram showing a state in which an insert is detached in the example.

A cylindrical insert 16 is provided inside the insert block 4. In the example shown in FIG. 1, a first threaded portion is provided on the outer peripheral surface of at least the lower end side of the insert 16, a second threaded portion is provided on the inner peripheral surface of the insert block 4 to be threaded with the first threaded portion on the outer peripheral surface of the insert 16, and the insert 16 is secured in a predetermined position in the housing 2 by the threading of the first threaded portion and the second threaded portion. In other words, the insert 16 can be attached to and detached from the insert block 4 by rotating the insert 16 relative to the insert block 4. With this, the insert 16 can then be detached from the housing 2 with the septum 20 and the septum nut 22 detached, as shown in FIG. 2. The predetermined position where the insert 16 is fixed by the insert block 4 is a position where the entire insert 16 is accommodated within the heating section. The insert block 4 constitutes an insert fixing portion for securing the insert 16 in place at the predetermined position.

The end portion of the separation column 102 for a gas chromatography analysis on the sample vaporization chamber 1 side is positioned from the bottom surface side of the housing 2, through the inside of the pipe 10, i.e., the inner side of the carrier gas block 8 and the heater block 6, to reach the insert 16. The insert 16 is used to guide the tip of the syringe needle inserted by piercing the septum 20 into the inner space 3 of the housing 2 to the appropriate position for injecting the sample directly into the separation column 102.

In this example, the carrier gas for transporting the sample injected into the end portion of the separation column 102 is supplied to the inside of the carrier gas block 8. A septum purge gas is supplied to the space above the insert 16 in the insert block 4.

Figure 3:
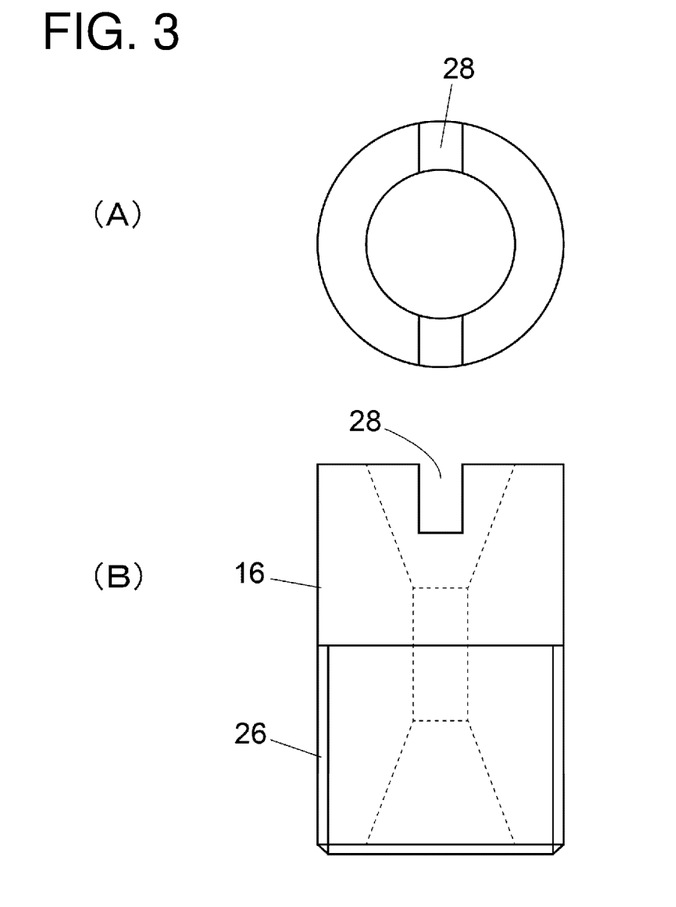
FIG. 3 is a diagram showing one example of the structure of an insert, wherein (A) is a diagram as viewed from the above, and (B) is a diagram as viewed from the front.

To facilitate the rotation of the insert 16 relative to the insert block 4, an engaging structure 28, as shown in FIG. 3, may be provided on the top surface of the insert 16. In the example in FIG. 3, the engaging structure 28 is realized by a straight shaped groove formed on the top surface of the insert 16. With such an engaging structure 28, the insert 16 can be rotated with a tool, such as a flat-blade screwdriver, inserted via the opening 18 of the housing 2, which makes it easy for the insert 16 to be attached to and detached from the insert block 4.

Figure 4:
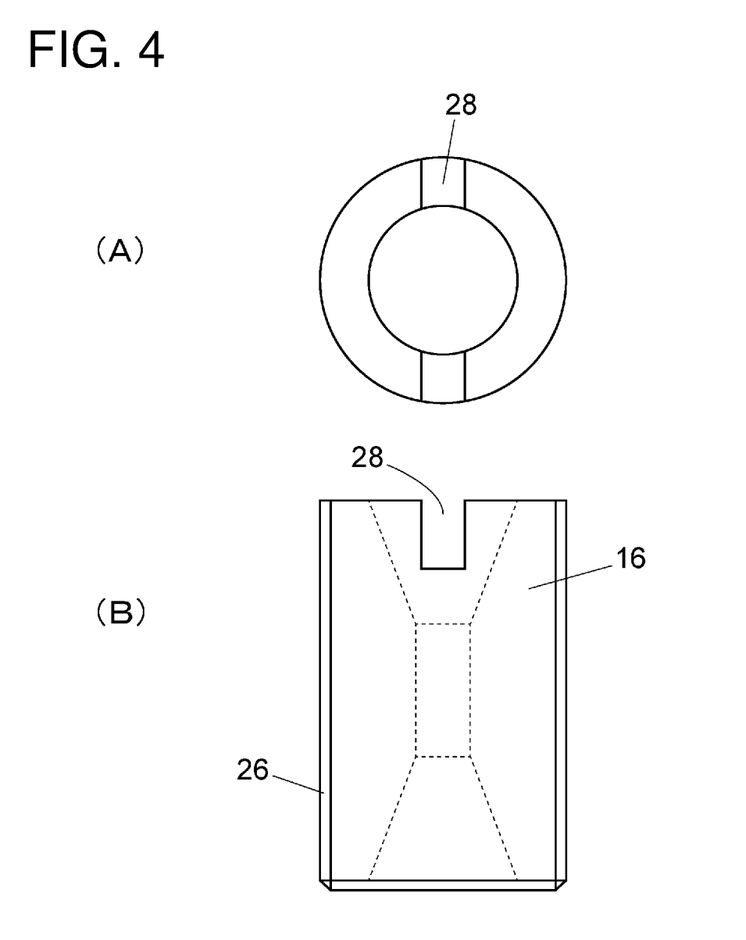
FIG. 4 is a diagram showing another example of the structure of an insert, wherein (A) is a diagram as viewed from the above, and (B) is a diagram as viewed from the front.
Figure 5:
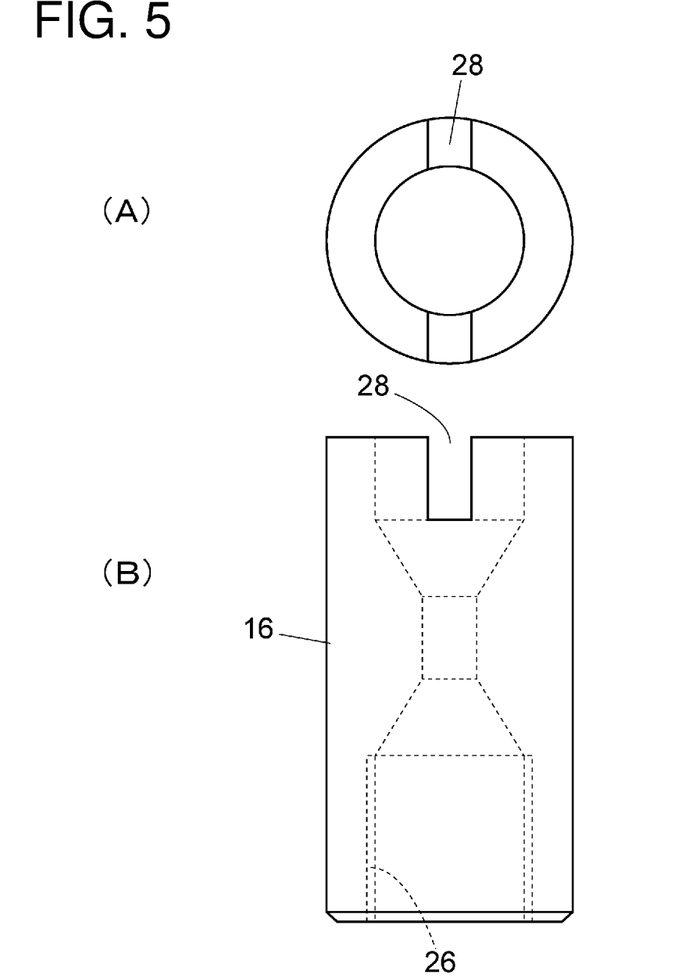
FIG. 5 is a diagram showing another example of the structure of an insert, wherein (A) is a diagram as viewed from the above, and (B) is a diagram as viewed from the front.

In the example of FIG. 3, the first threaded portion 26 is provided only on the lower part of the outer peripheral surface of the insert 16, but the first threaded portion 26 may be provided on the entire outer peripheral surface of the insert 16, as in the example of FIG. 4. Further, the first threaded portion 26 may be provided on the inner peripheral surface of the lower portion of the insert 16, as in the example in FIG. 5. In this case, the insert block 4 is provided with a structure, such as a projecting portion, having a second threaded portion formed on its outer peripheral surface. When the insert block is inserted from the below to the inner side of the insert 16, the second threaded portion is threaded with the first threaded portion 26 of the insert 16.

Figure 6:
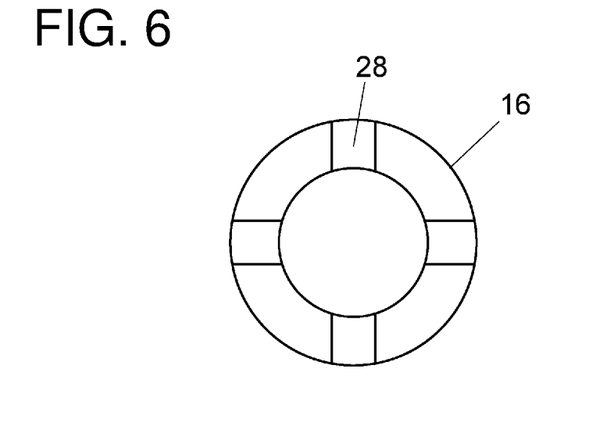
FIG. 6 is a diagram showing another example of an engaging structure for an insert.

Further, the engaging structure 28 provided on the insert 16 can be realized by cross-shaped grooves, as shown in FIG. 6. Other than the above, the engaging structure 28 of the insert 16 may be any structure as long as it allows a rod-shaped tool to be inserted through the opening 18 of the housing 2 to rotate the insert 16. The engaging structure 28 may be a structure configured to be engaged with the tip of a tool such as a hexagonal wrench.

The structure of the sample vaporization chamber 1 described above is one example, and the present invention is not limited thereto. For example, in the above-described example, three blocks, i.e., the insert block 4, the heater block 6, and the carrier gas block 8, are provided as separate blocks, but they may be provided as a single block.

Figure 7:
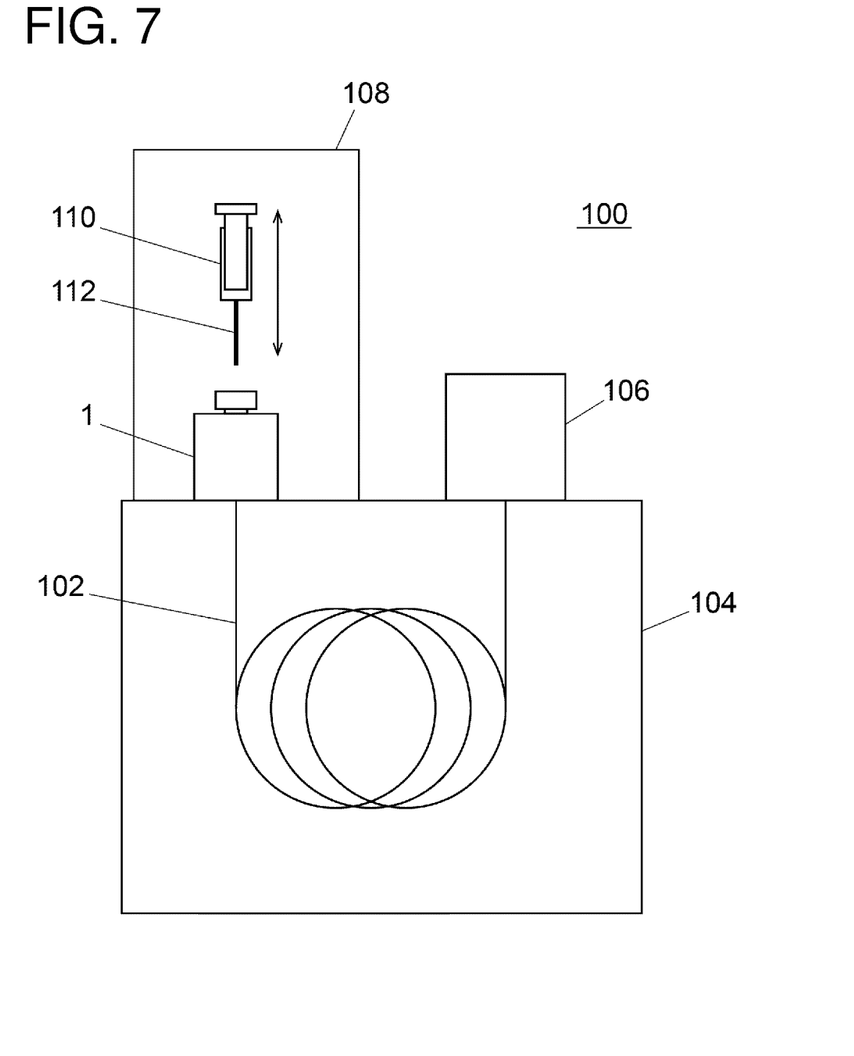
FIG. 7 is a schematic configuration diagram showing one example of a gas chromatograph.

Hereinafter, one example of a gas chromatograph equipped with the above-described sample vaporization chamber 1 will be described with reference to FIG. 7.

The gas chromatograph 100 is provided with the sample vaporization chamber 1, a separation column 102 for separating the components in the sample gas produced by the sample vaporization chamber 1 from each other, a housing 104 for accommodating the separation column 102 inside, a detector 106 for detecting the components in the sample gas separated from each other by the separation column 102, and an injector 108 for injecting a sample into the separation column 102.

The sample vaporization chamber 1 is attached to the top surface of the housing 104, and the detector 106 is mounted on the housing 104. One end of the separation column 102 accommodated inside the housing 104 extends upward to the insert 16 (see FIG. 1) in the sample vaporization chamber 1, and the other end of the separation column 102 is connected to the detector 106.

The injector 108 is mounted on the housing 104. The injector 108 is configured such that the sampling syringe 110 can be moved upward and downward above the sample vaporization chamber 1. The sample inhaled into the syringe 110 is injected into the separation column 102 by being injected from the syringe 110 to the end portion of the separation column 102 in a state in which the needle 112 of the syringe 110 is inserted into the sample vaporization chamber 1. In the sample vaporization chamber 1, after the sample is injected into the separation column 102, and the needle 112 of the syringe 110 is pulled out of the sample vaporization chamber 1, heating by the heater 12 is initiated, and the heating section of the sample vaporization chamber 1 is raised to about 450° C. With that, the sample is vaporized to become a sample gas. The sample gas flows through the separation column 102, and the components are separated and detected by the detector 106.

Note that the example described above is merely one example of an embodiment of the sample evaporation chamber and the gas chromatograph according to the present invention. Embodiments of the sample vaporization chamber and the gas chromatograph according to the present invention are shown below.

A sample vaporization chamber for gas chromatograph according to the present invention includes a housing provided with a heater therein, the housing being provided, on a top surface thereof, with an opening sealed by a septum, the sample vaporization chamber being configured to heat a sample with the heater to vaporize the sample to produce a sample gas, the sample being injected into an inner space of the housing with a syringe needle inserted into the inner space via the opening by piercing the septum, the sample vaporization chamber comprising:

a cylindrical insert provided, at least on a lower end side of an inner peripheral surface or an outer peripheral surface thereof, with a first threaded portion; and an insert fixing portion provided with a second threaded portion to be threaded with the first threaded portion in the inner space of the housing, the insert fixing portion being configured to fix the insert in the inner space of the housing in a state in which the insert is accommodated in the inner space by threading the first threaded portion of the insert inserted in the inner space through the opening with the second threaded portion.

In the first aspect of one embodiment of the sample vaporization chamber according to the present invention, an entirety of the insert is configured to be accommodated within a heating section to be heated by the heater. With this aspect, the sample adhered to the insert as the syringe needle contacts the insert is also vaporized by the heat from the heater, so the insert becomes less likely to be contaminated by the sample, and the insert replacement frequency can be reduced.

In the second aspect of the embodiment of the sample vaporization chamber according to the present invention, the insert is provided, on an outer peripheral surface thereof, with the first threaded portion, and the insert fixing portion is a cylindrical member provided, on an inner peripheral surface thereof, with the second threaded portion. With this aspect, the structure for fixing the insert to the insert fixing portion is simplified, which can reduce the cost of components.

In a third aspect of the embodiment of the sample vaporization chamber according to the present invention, an engaging structure is provided on the top surface of the insert, and by inserting a tool having a structure at its tip that engages the engaging structure into the inner space through the opening to engage the engaging structure and rotating the tool, the insert can be attached to or detached from the insert fixing portion by rotating the tool. With this aspect, the attachment and the detachment of the insert to and from the insert fixing portion can be performed easily, and the workload for replacing the insert can be reduced.

One embodiment of a gas chromatograph according to the present invention is provided with:

the above-described sample vaporization chamber, a separation column having one end in communication with the inner space of the housing of the sample vaporization chamber, the separation column being configured to separate components in the sample gas produced by the sample vaporization chamber from each other; and a detector in fluid communication with the other end of the separation column, the detector being configured to detect the components separated from each other by the separation column.

DESCRIPTION OF REFERENCE SYMBOLS

1: Sample vaporization chamber
2: Housing
3: Inner space
4: Insert block
5: Sheet metal
6: Heater block
8: Carrier gas block
10: Pipe
12: Heater
14: Heat insulation material
16: Insert
18: Opening
20: Septum
22: Septum nut
24: Through hole
25: Bolt
26: First threaded portion
28: Engaging structure
100: Gas chromatograph
102: Separation column

106: Detector
108: Injector
110: Syringe
112: Needle (Syringe needle)

The invention claimed is:

1. A sample vaporization chamber for gas chromatograph, the sample vaporization chamber having a housing provided with a heater therein, the housing being provided, on a top surface thereof, with an opening sealed by a septum, the sample vaporization chamber being configured to heat a sample with the heater to vaporize the sample to produce a sample gas, the sample being injected into an inner space of the housing with a syringe needle inserted into the inner space via the opening by piercing the septum, the sample vaporization chamber comprising:
a cylindrical insert provided, at least on a lower end side of an inner peripheral surface or an outer peripheral surface thereof, with a first threaded portion; and
an insert fixing portion provided with a second threaded portion to be threaded with the first threaded portion in the inner space of the housing, the insert fixing portion being configured to fix the insert in the inner space of the housing in a state in which the insert is accommodated in the inner space by threading the first threaded portion of the insert inserted in the inner space through the opening with the second threaded portion,
wherein the heater is positioned on the outer peripheral surface of the insert accommodated in the inner space.

2. The sample vaporization chamber as recited in claim 1, wherein an entirety of the insert is configured to be accommodated within a heating section to be heated by the heater.

3. The sample vaporization chamber as recited in claim 1,
wherein the first threaded portion is provided on the outer peripheral surface of the insert, and
wherein the insert fixing portion is a cylindrical member provided, on an inner peripheral surface thereof, with the second threaded portion.

4. The sample vaporization chamber as recited in claim 1,
wherein the insert is provided, on a top surface thereof, with an engaging structure, and
wherein the insert is configured to be attached to or detached from the insert fixing portion by inserting a tool having, at a tip thereof, a structure engageable with the engaging structure into the inner space through the opening and rotating the tool.

5. A gas chromatograph comprising:
the sample vaporization chamber as recited in claim 1, the sample vaporization chamber having a housing provided, at a top surface thereof, with an opening sealed by a septum, the sample vaporization chamber being configured to heat a sample with the heater to vaporize the sample to produce a sample gas, the sample being injected into an inner space of the housing with a syringe needle inserted into the inner space via the opening by piercing the septum;
a separation column having one end in communication with the inner space of the housing of the sample vaporization chamber, the separation column being configured to separate components in the sample gas produced by the sample vaporization chamber from each other; and
a detector in fluid communication with the other end of the separation column, the detector being configured to detect the components separated from each other by the separation column.

\* \* \* \* \*